United States Patent
Smith et al.

(10) Patent No.: US 10,655,638 B2
(45) Date of Patent: May 19, 2020

(54) TURBOMOLECULAR PUMP DEPOSITION CONTROL AND PARTICLE MANAGEMENT

(71) Applicant: Lam Research Corporation, Fremont, CA (US)

(72) Inventors: Dennis Smith, San Jose, CA (US); Peter Reimer, Mountain View, CA (US)

(73) Assignee: Lam Research Corporation, Freemont, CA (US)

( * ) Notice: Subject to any disclaimer, the term of this patent is extended or adjusted under 35 U.S.C. 154(b) by 127 days.

(21) Appl. No.: 15/922,857

(22) Filed: Mar. 15, 2018

(65) Prior Publication Data

US 2019/0285090 A1    Sep. 19, 2019

(51) Int. Cl.
| F04D 29/58 | (2006.01) |
| F04D 19/04 | (2006.01) |
| F04D 29/54 | (2006.01) |
| H05B 3/26 | (2006.01) |
| B33Y 80/00 | (2015.01) |
| B33Y 10/00 | (2015.01) |

(52) U.S. Cl.
CPC ......... *F04D 29/584* (2013.01); *F04D 19/046* (2013.01); *F04D 29/545* (2013.01); *H05B 3/26* (2013.01); *B33Y 10/00* (2014.12); *B33Y 80/00* (2014.12); *F04D 19/042* (2013.01); *F04D 19/044* (2013.01)

(58) Field of Classification Search
CPC ...... F04D 19/04; F04D 19/042; F04D 19/044; F04D 19/046; F04D 29/545; F04D 29/584; F04D 17/06; F04D 23/008; H05B 3/26; B33Y 10/00; B33Y 80/00

USPC ................................ 415/90, 143; 417/423.4
See application file for complete search history.

(56) References Cited

U.S. PATENT DOCUMENTS

| 5,924,841 A | 7/1999 | Okamura et al. |
| 6,375,413 B1 | 4/2002 | Stones |
(Continued)

FOREIGN PATENT DOCUMENTS

WO    2005033521    4/2005

OTHER PUBLICATIONS

"International Application Serial No. PCT US2019 021894, International Search Report dated Jun. 26, 2019", 4 pgs.
(Continued)

*Primary Examiner* — Moshe Wilensky
*Assistant Examiner* — Elton K Wong
(74) *Attorney, Agent, or Firm* — Schwegman Lundberg & Woessner, P.A.

(57) ABSTRACT

A gas pump and processes for preparing the gas pump are presented. The gas pump includes a bottom Holweck stage with internal heaters for cleaning deposits resulting from exhausting gases from a semiconductor manufacturing chamber. One example gas pump includes a turbomolecular stage on a top section of the gas pump and a Holweck stage below the turbomolecular stage. The Holweck stage comprises a rotor element, a stator element with an opening in the center, and one or more heaters. The opening has a substantially cylindrical shape and an inside surface with a plurality of grooves separated by threads. Each heater is situated on a surface of one of the plurality of grooves. The heaters may be turned on to clean the deposits accumulated on the gas pump during the processing of a substrate.

18 Claims, 13 Drawing Sheets

(56) References Cited

U.S. PATENT DOCUMENTS

| | | | |
|---|---|---|---|
| 6,435,811 B1 | 8/2002 | Beyer et al. | |
| 6,926,493 B1* | 8/2005 | Miyamoto | F04D 19/042 |
| | | | 415/143 |
| 2002/0090309 A1* | 7/2002 | Yamashita | F04D 19/04 |
| | | | 417/423.4 |
| 2002/0114695 A1* | 8/2002 | Fahrenbach | F04D 19/04 |
| | | | 415/90 |
| 2004/0228747 A1 | 11/2004 | Desbiolles | |
| 2013/0248511 A1* | 9/2013 | Wallinger | H05B 1/0294 |
| | | | 219/510 |
| 2015/0184665 A1* | 7/2015 | Yamato | F04D 19/042 |
| | | | 415/47 |
| 2015/0226229 A1 | 8/2015 | Tsutsui | |
| 2018/0238334 A1* | 8/2018 | Moriyama | F04D 19/042 |

OTHER PUBLICATIONS

"International Application Serial No. PCT US2019 021894, Written Opinion dated Jun. 26, 2019", 5 pgs.

"Ammonium flurosilicate", Wikipedia, [Online] Retrieved from the internet on Jul. 3, 2019: <URL: https://web.archive.org/web/20170214143046/https://en.wikipedia.org/wiki/Ammonium_fluorosilicate>, (Nov. 27, 2016), 5 pgs.

Wall, L.A., "Thermal Decomposition of Polytetrafluoroethylene in Various Gaseous Atmospheres", Journal of Research of the National Bureau of Standards, 56(1), (Jan. 1956), 8 pgs.

* cited by examiner

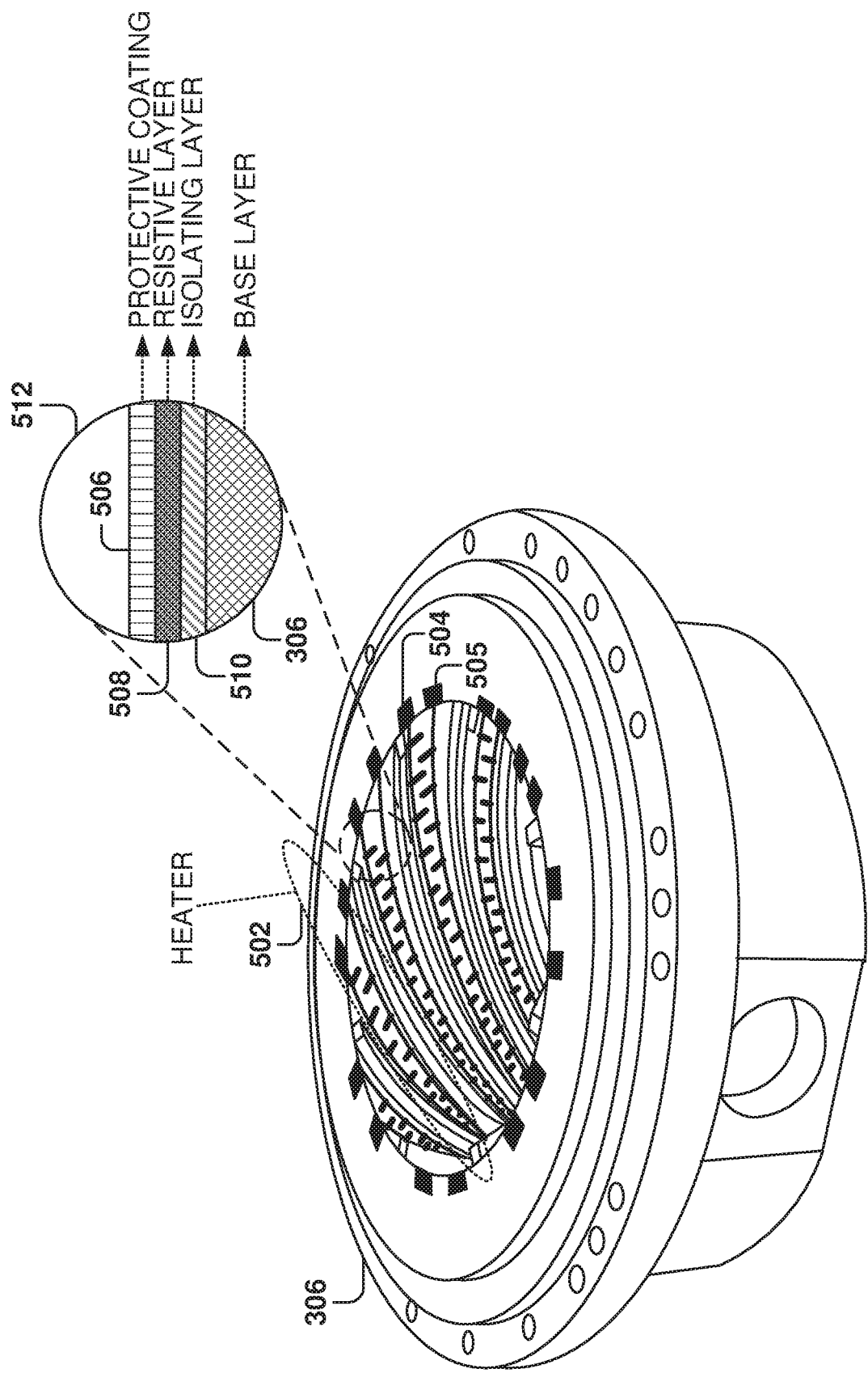

TURBOMOLECULAR PUMP DEPOSITION CONTROL AND PARTICLE MANAGEMENT

TECHNICAL FIELD

The subject matter disclosed herein generally relates to methods, systems, and programs for cleaning a semiconductor manufacturing apparatus. In some examples, deposition control and particle management is provided during operation of a semiconductor manufacturing apparatus.

BACKGROUND

A gas pump is used in semiconductor manufacturing for extracting gases from the chamber. In some cases, the gas pump is a turbomolecular pump. The gases travel through multiple stages in the gas pump, and as the gases travel down through the gas pump, the gas pressure changes, which may cause the gases to solidify and create residues on the inside of the gas pump. The residues may clog the gas pump, thereby limiting or stopping the gas pump from proper operation.

In some cases, the outside of the gas pump is heated to raise the temperature of the gas pump to try to prevent the gases going through the gas pump from developing deposition byproducts. However, the amount of heating that may be applied to the gas pump is limited due to various factors, such as, rotor material, rotational speed, and temperature. For example, some aluminum rotors may not be operated above 130° C.

In many cases, it is difficult to determine if the gas pump is failing because it is not easy to access and examine the inside of the gas pump for residue. It has been observed that the operation of the chamber often degrades and/or malfunctions over time. The degradation sometimes can be resolved by changing the gas pump, indicating that gas pump malfunction is the root cause of the degradation. One of the main causes of malfunction is the deposition of materials inside the rotor and the inside walls of the gas pump.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Example methods, systems, and computer programs are directed to a gas pump having a bottom Holweck stage with internal heaters for cleaning deposits resulting from exhausting gases from a semiconductor manufacturing chamber. Examples merely typify possible variations.

In one implementation, a gas pump is presented. The gas pump has an upper section and is configured for extracting gases from a chamber. The gas pump comprises a turbomolecular stage arranged in the upper section, and a Holweck stage arranged below or adjacent to the turbomolecular stage. The Holweck stage comprises a rotor element, a stator element, and one or more heaters. The stator element has an opening, the opening having a substantially cylindrical shape and an inside surface including a plurality of grooves, each of the plurality of grooves having a surface and the plurality of grooves being separated by threads. Each of the one or more heaters are situated on at least a surface of a corresponding groove.

In one example, each heater comprises a resistive material disposed on the surface of the corresponding groove.

In one example, the gas pump further includes a dielectric coating layer placed between each heater and the surface of the corresponding groove.

In one example, the plurality of grooves has a helical or spiral shape.

In one example, each heater is placed on the surface of the corresponding groove extending from a first end of the corresponding groove to a second end of the corresponding groove, where each heater comprises one or more connection pads for connecting to electrical power.

In one example, the one or more heaters include a plurality of first heaters and a plurality of second heaters, and one or more of the plurality of first heaters is placed on a first section of a corresponding groove and one or more of the plurality of second heaters is placed on a second section of the corresponding groove.

In one example, the first plurality of heaters and the second plurality of heaters are turned on at the same time or at different times.

In one example, one or more of the first plurality of heaters are turned on at the same time or at different times, and one or more of the second plurality of heaters are turned on at the same time or at different times.

In one example, at least one heater is disposed in a zigzag pattern formed by resistive material.

In one example, at least one heater is disposed in parallel lines of resistive material.

In one example, one of the one or more heaters is situated on surfaces of two or more corresponding grooves.

In one example, at least two of the one or more heaters are situated on a surface of a corresponding groove.

In one example, the at least two of the one or more heaters are turned on at the same time or at different time.

In one example, the one or more heaters are configurable to provide varying levels of heating.

In one example, the varying levels of heating are provided according to deposits to be cleaned from the gas pump.

In one example, the one or more heaters are turned on based on analysis of output of the gas pump.

In one example, the one or more heaters comprise a plurality of heating elements that are independently controlled, each of the plurality of grooves including one or more of the heating elements.

In one example, at least one of the plurality of heating elements is switched on to eliminate a deposit and turned off when a temperature of the heating element is above a sublimation temperature of the deposit.

In another implementation, a process for manufacturing a gas pump is presented. The process includes operations for providing a body having a top section, and for placing a turbomolecular stage in the top section. The method further includes an operation for placing a rotor element of a Holweck stage in the body below or adjacent to the turbomolecular stage. In addition, the method includes an operation for providing a stator element of the Holweck stage in which the rotor element may rotate in use. The stator element has an opening, the opening having a substantially cylindrical shape and an inside surface including a plurality of grooves. Each of the plurality of grooves has a surface and the plurality of grooves is separated by threads. The method further includes an operation for printing one or more heaters on the surfaces of corresponding grooves, each heater printed on at least a surface of a corresponding groove. Additionally, the method includes an operation for placing the stator element in the body below the turbomolecular stage.

In one example, the printing of one or more heaters is performed by a three-dimensional (3D) printer that places resistive, non-conductive and conductive material on the surfaces of the corresponding grooves.

In one example, the 3D printer is coupled to one or more connected robotic arms that enable the 3D printer to print on a helical surface of a corresponding groove.

In one example, each heater comprises a conductive material disposed on a surface of a corresponding groove.

In one example, the process further includes, before printing the one or more heaters, placing dielectric coating layers on the surfaces of the corresponding grooves, where printing one or more heaters further comprises printing the one or more heaters on the dielectric coating layers.

In one example, each heater is placed on a surface of a corresponding groove extending from a first end of the groove to a second end of the groove, where each heater comprises connection pads for connecting to electrical power.

In one example, the one or more heaters are disposed in a zigzag pattern formed by resistive material or in parallel lines of resistive material.

In one example, printing one or more heaters further comprises placing one of the one or more heaters on surfaces of two or more corresponding grooves.

In one example, printing one or more heaters further comprises placing at least two of the one or more heaters on a surface of a corresponding groove.

In another implementation, a method for cleaning a gas pump is presented. The method includes an operation for activating a gas pump to extract gases from a chamber of a semiconductor manufacturing apparatus during processing of one or more substrates. The gas pump comprises a turbomolecular stage and a Holweck stage below the turbomolecular stage. The Holweck stage comprises a rotor element, a stator element with an opening, and one or more heaters. The opening has a substantially cylindrical shape and an inside surface with a plurality of grooves, each of the plurality of grooves having a surface and the plurality of grooves being separated by threads. Each heater is situated on at least a surface of a corresponding groove. The method further includes an operation for activating the one or more heaters to heat up the inside surface of the stator element in the Holweck stage after the one or more substrates have been processed.

In one example, activating the one or more heaters further comprises activating the one or more heaters after a predetermined number of substrates has been processed.

In one example, the predetermined number of substrates is one (1).

In one example, the predetermined number of substrates is at least two (2).

In one example, activating the one or more heaters further comprises activating the one or more heaters to heat up the inside surface to a temperature that is sufficient for removing deposits formed and accumulated on the inside surface.

In one example, activating the one or more heaters further comprises activating the one or more heaters at different times or all at the same time.

In one example, the one or more heaters further comprises activating the one or more heaters to provide varying levels of heating.

In one example, the varying levels of heating are provided according to deposits to be cleaned from the gas pump.

In one example, the one or more heaters are activated based on analysis of output of the gas pump.

In yet another implementation, a method for operating a gas pump during substrate processing is presented. The method includes an operation for activating a gas pump to extract gases from a chamber of a semiconductor manufacturing apparatus during processing of one or more substrates. The gas pump comprises a turbomolecular stage and a Holweck stage below the turbomolecular stage. The Holweck stage comprises a rotor element, a stator element with an opening, and one or more heaters. The opening has a substantially cylindrical shape and an inside surface with a plurality of grooves, each of the plurality of grooves having a surface and the plurality of grooves being separated by threads. Each heater is situated on at least a surface of a corresponding groove. Further, the method includes an operation for activating the one or more heaters to heat up the inside surface of the stator element in the Holweck stage during the processing of the one or more substrates.

In one example, activating the one or more heaters further comprises activating the one or more heaters to a temperature sufficient to prevent formation of deposits.

In one example, activating the one or more heaters further comprises activating the one or more heaters intermittently during the processing of the one or more substrates.

In one example, activating the one or more heaters intermittently further comprises activating the heaters for a period between one and twenty seconds, and deactivating the heaters for a period between one and twenty seconds.

In one example, activating the one or more heaters further comprises activating the one or more heaters to provide varying levels of heating according to deposits to be prevented from forming and accumulating on the inside surface during processing of the one or more substrates.

In one example, activating the one or more heaters further comprises activating the one or more heaters at different times or all at the same time.

In one example, the varying levels of heating are provided according to deposits to be stopped from forming on the gas pump.

In one example, the one or more heaters are activated based on analysis of output of the gas pump.

BRIEF DESCRIPTION OF THE DRAWINGS

Various ones of the appended drawings merely illustrate example embodiments of the present disclosure and cannot be considered as limiting its scope.

FIG. 5 is the Holweck stage with printed electrical heaters, according to some example embodiments.

DETAILED DESCRIPTION

In some examples, deposition control and particle management may be provided during operation of a chamber to which a gas pump or Holweck stage of the present disclosure is fitted. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The turbomolecular pump in the etch chamber takes reacted process gases at low pressures and compresses them significantly to a point that dry pumps can further compress and exhaust the gases to a scrubber system at atmospheric pressure. During the compression of gases in various stages of the turbomolecular pump, some gas species changes state from a gas to a solid, which usually results in deposits accumulating in the bottom stage (e.g., the Holweck stage) of the turbomolecular pump.

Implementations of the Holweck stage place a printed heater inside the Holweck stage, causing the deposits to be volatized and removed from the gas pump. If these deposits are removed, turbomolecular pump reliability is improved. The technology presented herein includes placing the printed heater, such as, a printable inert thin film heater, on the inside of the turbomolecular pump body. The placement of the printed heater on the turbomolecular pump interior allows the removal or minimization of deposition formed inside the turbomolecular pump.

Figure 1:
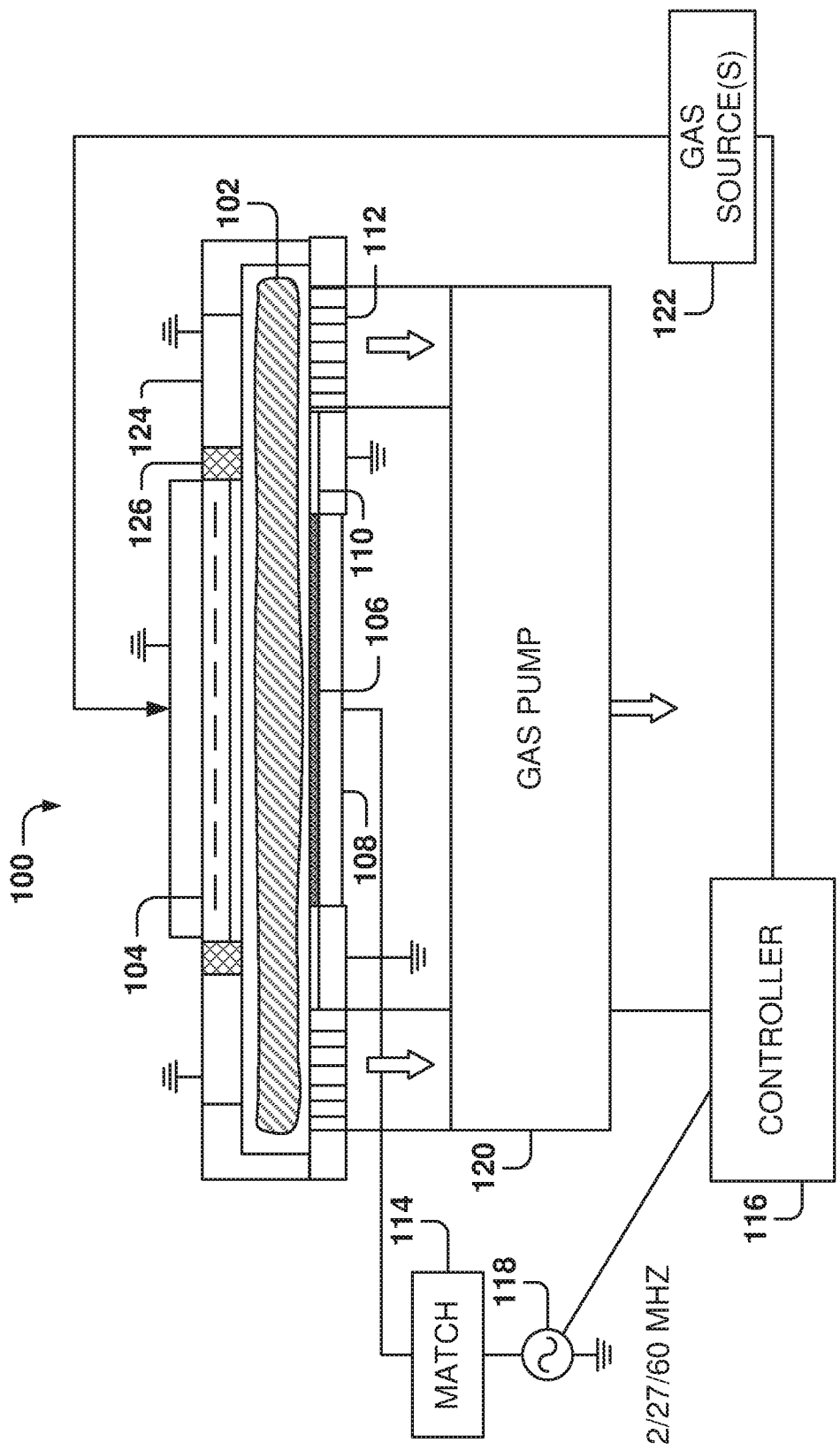
FIG. 1 is an etching chamber, according to some example embodiments.

FIG. 1 shows an etching chamber 100, according to one embodiment. Exciting an electric field between two electrodes is one of the methods to obtain radiofrequency (RF) gas discharge in an etching chamber. When an oscillating voltage is applied between the electrodes, the discharge obtained is referred to as a Capacitive Coupled Plasma (CCP) discharge.

Plasma may be created utilizing stable feedstock gases to obtain a wide variety of chemically reactive by-products created by the dissociation of the various molecules caused by electron-neutral collisions. The chemical aspect of etching involves the reaction of the neutral gas molecules and their dissociated by-products with the molecules of the to-be-etched surface, and producing volatile molecules, which can be pumped away. When plasma is created, the positive ions are accelerated from the plasma across a space-charge sheath separating the plasma from chamber walls to strike the wafer surface with enough energy to remove material from the wafer surface. This is known as ion bombardment or ion sputtering. Some industrial plasmas, however, do not produce ions with enough energy to efficiently etch a surface by purely physical means.

In one embodiment, fluorocarbon gases, such as $CF_4$ and $C-C_4F_8$, are used in a dielectric etch process for their anisotropic and selective etching capabilities, but the principles described herein can be applied to other plasma-creating gases. The fluorocarbon gases are readily dissociated into chemically reactive by-products that include smaller molecular and atomic radicals. These chemically reactive by-products etch away the dielectric material, which in one embodiment can be $SiO_2$ or SiOCH for low-k devices.

The chamber 100 illustrates a processing chamber with a top electrode 104 and a bottom electrode 108. The top electrode 104 may be grounded or coupled to an RF generator (not shown), and the bottom electrode 108 is coupled to RF generator 118 via matching network 114. RF generator 118 provides RF power in one, two, or three different RF frequencies. According to the desired configuration of the chamber 100 for a particular operation, at least one of the three RF frequencies may be turned on or off. In the embodiment shown in FIG. 1, RF generator 118 provides 2 MHz, 27 MHz, and 60 MHz frequencies, but other frequencies are also possible.

The chamber 100 includes a gas showerhead on the top electrode 104 to input gas into the chamber 100, and a perforated confinement ring 112 that allows the gas to be pumped out of the chamber 100 by gas pump 120. In some example embodiments, the gas pump 120 is a turbomolecular pump, but other type of gas pumps may be utilized.

When substrate 106 is present in the chamber 100, silicon focus ring 110 is situated next to the substrate 106 such that there is a uniform RF field at the bottom surface of the plasma 102 for uniform etching on the surface of the substrate 106. The embodiment of FIG. 1 shows a triode reactor configuration where the top electrode 104 is surrounded by a symmetric RF ground electrode 124. Insulator 126 is a dielectric that isolates ground electrode 124 from top electrode 104.

Each frequency may be selected for a specific purpose in the wafer manufacturing process. In the example of FIG. 1, with RF powers provided at 2 MHz, 27 MHz, and 60 MHz, the 2 MHz RF power provides ion energy control, and the 27 MHz and 60 MHz power provide control of the plasma density and the dissociation patterns of the chemistry. This configuration, where each RF power may be turned on or off, enables certain processes that use ultra-low ion energy on the substrates or wafers, and certain processes (e.g., soft etch for low-k materials) where the ion energy has to be low (under 100 or 200 eV).

In another embodiment, a 60 MHz RF power is used on the top electrode 104 to get ultra-low energies and very high density. This configuration allows chamber cleaning with high density plasma when the substrate is not in the chamber 100, while minimizing sputtering on the ESC (electro static chuck) surface. The ESC surface is exposed when the substrate is not present, and any ion energy on the surface must be avoided, which is why the bottom 2 MHz and 27 MHz power supplies may be off during cleaning.

Figure 2:
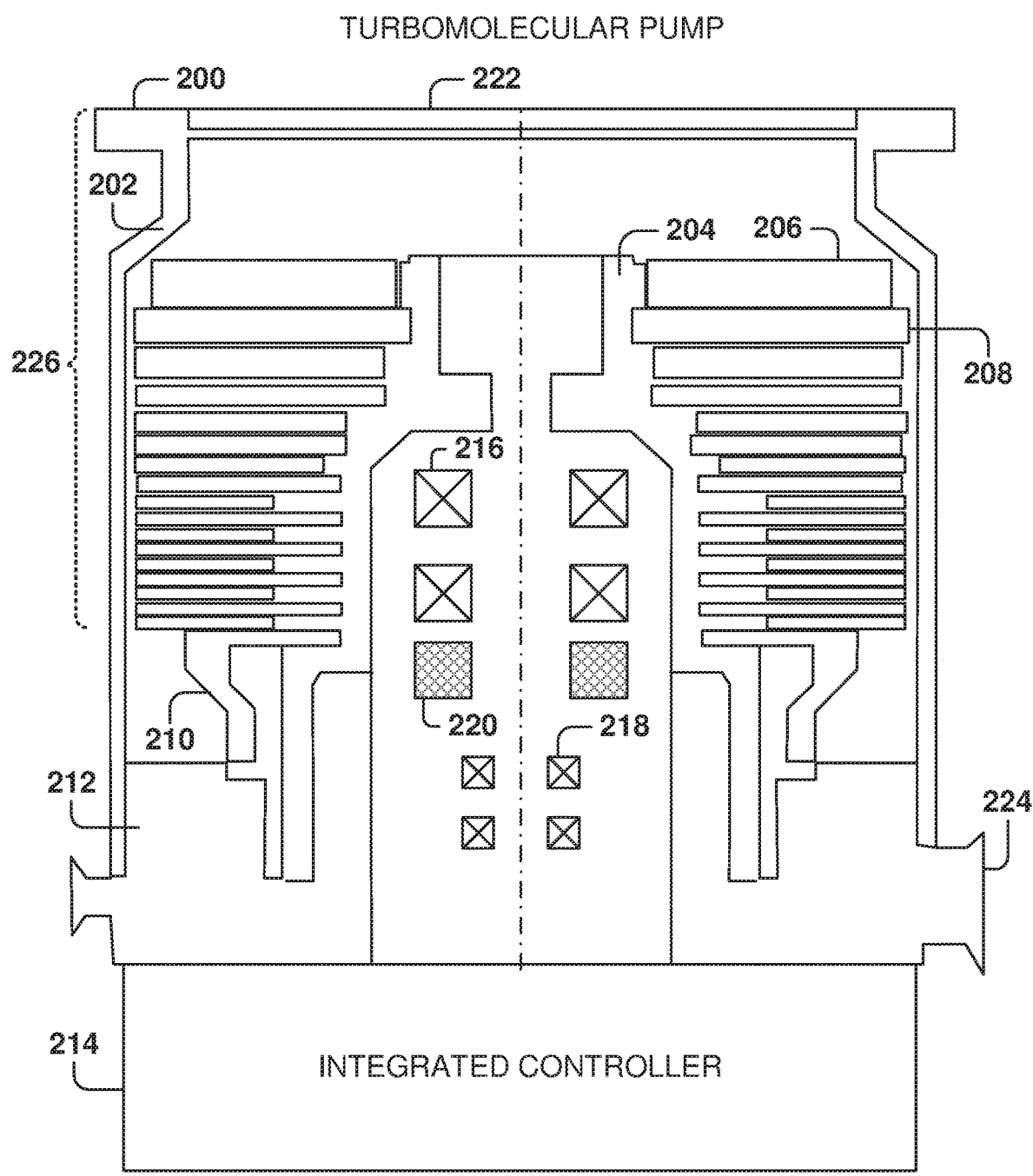
FIG. 2 is a sectional view of a turbomolecular pump with a Holweck stage, according to some example embodiments.

FIG. 2 is a sectional view of a turbomolecular pump 200, including a Holweck stage, that may be used as the gas pump 120, according to some example embodiments. Some details have been omitted for the purpose of illustration simplicity. A rotor 204 rotates within a pump casing 202. The turbomolecular pump 200 is a magnetic bearing type pump, and the rotor 204 is supported in a non-contact manner by electromagnets 216 and 218 that constitute a five-axis magnetic bearing. The rotor 204 is magnetically levitated by the magnetic bearing and is rotationally driven at high speed by a motor 220.

The rotor 204 includes a number of stages of rotating blades 206, and a fixed side including fixed blades 208 arranged alternately with the rotating blades 206 along the axial direction. Each of the fixed blades 208 is mounted to a base 212.

An outlet port 224 is provided at the base 212, and a back pump (not shown) is connected to the outlet port 212. Due to the rotor 204 being rotationally driven at high speed by a motor 220, while being magnetically levitated, gas molecules at inlet opening 222 are evacuated toward the outlet port 224.

The fixed blades 208 and the rotating blades 206 form a turbomolecular stage 226 at a top section of the turbomolecular pump 200, and a Holweck stage 210 is situated below the turbomolecular stage 226. An integrated controller 214 is configurable for managing the operations of the turbomolecular pump 200.

During operation of the turbomolecular pump 200, some of the gases going through may become solids when the pressure gradually increases as the gases exit. The solids may then deposit on the internal parts of the turbomolecular pump 200.

In some arrangements, an external heater is placed on the outside of the turbomolecular pump 200, but the effectiveness of the external heater is limited by the composition of the pump materials (e.g., aluminum), rotational speed and internal rotor temperature. As a result, only limited amounts of heat may eventually reach the deposits on the inside of the Holweck stage 210. One alternative would be to change the construction materials of the rotor from aluminum to titanium. This would allow for increases in operating temperature of the rotor. However, there is a cost penalty as the cost of the pump would be considerably higher, such as at four times the cost. Thus, for a number of reasons, arrangements with external heaters have proven unsatisfactory.

When particles are formed in the inside of the turbomolecular pump 200, there may be a back-stream effect where gases or the formed particles flow back into the chamber 100, which may result in a decrease of the reliability of the chamber 100.

In some present embodiments, heaters are printed on the inside of the Holweck stage 210. The printed heaters may heat up the inside of the Holweck stage 210, thereby minimizing and/or preventing the deposition and accumulation of undesired particles within the Holweck stage 210. More details are provided below with reference to the forming and operation of the printed heaters.

Figure 3:
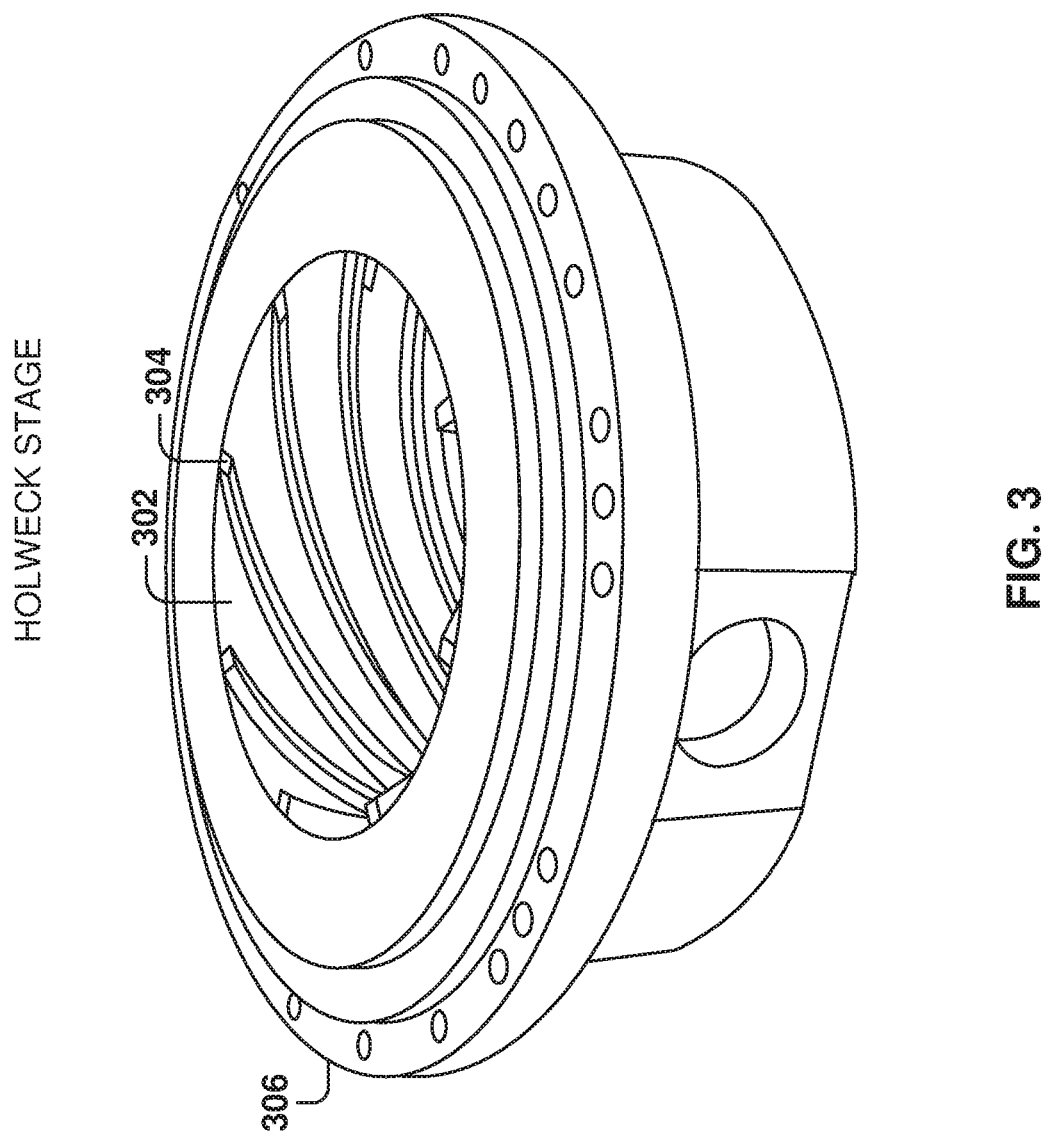
FIG. 3 is the stator of the Holweck stage of the turbomolecular pump, according to some example embodiments.

FIG. 3 is a stator 306 of the Holweck stage 210 of the turbomolecular pump 200, according to some example embodiments. On the inside surfaces of the stator 306, grooves 302 extend in the axial direction and are separated by threads 304. In some example embodiments, the grooves 302 have a helical or a spiral shape, but other shapes may also be utilized.

As noted earlier, the turbomolecular pump 200 includes the turbomolecular stage 226 and the Holweck stage 210. The turbomolecular stage 226 and the Holweck stage 210 handle different volumes of exhausted gas. In general, the pressure at the Holweck stage 210 is higher than the pressure at the turbomolecular stage 226 (e.g., ten times), and, in some example embodiments, the exit of the Holweck stage 210 is at pressures between 50 mt-400 torr. The pressure increases as the gases go down the turbomolecular pump 200, until the pressure falls out to atmospheric pressure. Many of the deposit problems occur at the Holweck stage 210 because the pressures are higher at this stage and the gases may become solids at these higher pressures.

There is a limit to how much the outside of the stator 306 may be heated because if it is heated too much the rotor spinning inside will get too hot. If the rotor is made of aluminum, as the rotor gets hotter, the rotor loses its strength, stretches, and may touch the stator 306 creating catastrophic results.

In some example embodiments, heaters are placed on the stator 306 of the Holweck stage 210 on the surface of the grooves 302. The heaters may heat the surfaces of the grooves 302 for a short period of time to avoid heating the rotor too much, to a point where the rotor may start melting. In some example embodiments, the heaters may reach a temperature of up to 500° C., but only for the short period of time (e.g., one second). The control of the temperature is easier because only the surfaces where deposits occur are heated. On the other hand, if the whole stator 306 is heated, it is more difficult to raise and lower the temperature due to the bigger volume of material that is heated.

It is noted that the embodiments are presented herein for placing printed heaters on the Holweck stage 210, but the same principles may be applied for providing printed heaters in other stages. In other example embodiments, the printed heaters may also be printed inside the stator blades of the turbomolecular stage 226.

Figure 4A:
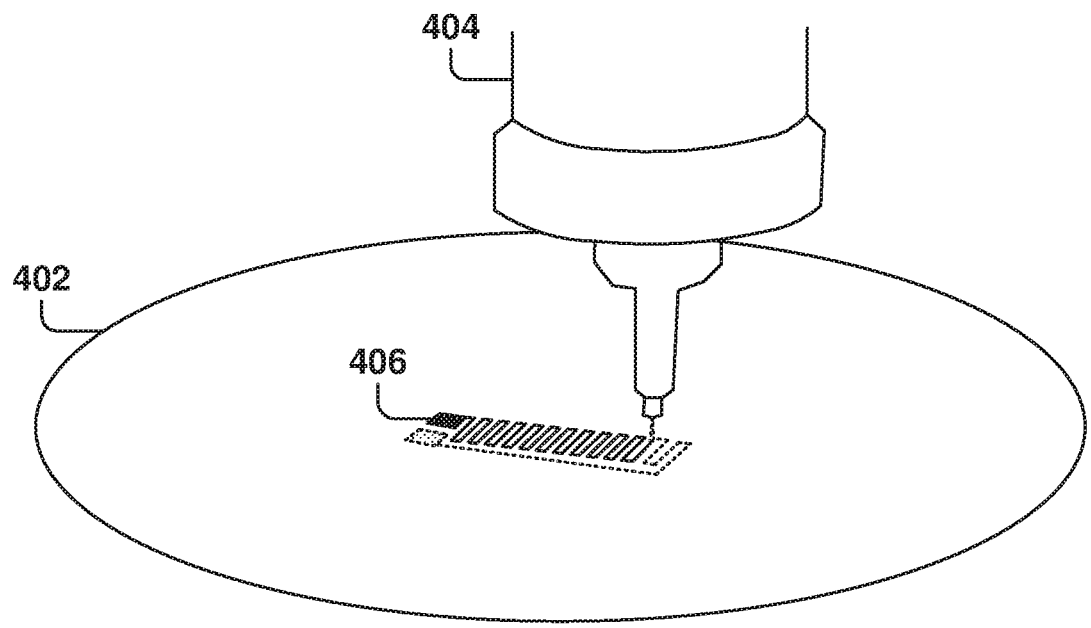
FIG. 4A illustrates the process of 3D printing an electrical heater, according to some example embodiments.

FIG. 4A illustrates the process of 3D printing a heater that may be used with the Holweck stage 210, according to some example embodiments. In some example embodiments, the heaters are deposition heaters formed by building layers of conductive, non-conductive, and resistive films that are deposited on a surface. Once a resistive film is powered, the resistive material within the resistive film heats up to perform the heating function.

FIG. 4A shows a heater 406 being printed on a flat surface 402, such as a dielectric material, by a 3D printer 404. In some example embodiments, the printer 404 may be stationary while the surface 402 moves to create the pattern. In other example embodiments, the surface 402 may remain stationary while the printer 404 moves to create the pattern.

In the example of FIG. 4A, a heater 406 is formed by printing a zigzag pattern formed by interconnected straight parallel lines. Other heaters may comprise other patterns of resistive material. In general, the resistance of the material in the heater is configured to create the desired temperature based on the power applied to the heater.

In some example embodiments, the heater 406 may be printed on a 3D surface (e.g., a non-flat surface), as described in more detail below with reference to FIGS. 5-6.

Figure 4B:
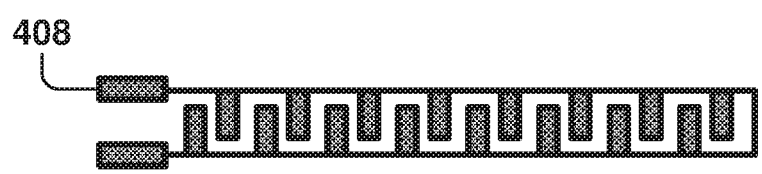
FIGS. 4B-4C illustrate additional embodiments of patterns for the electrical heater.
Figure 4C:
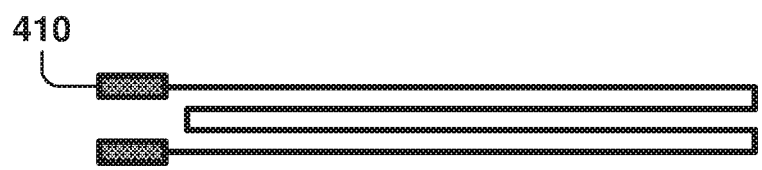

FIGS. 4B-4C illustrate additional embodiments of patterns for the heater 406. In some example embodiments, the 3D printer 404 includes a camera, and FIG. 4B shows the view of a heater 408 from the camera after the printing is completed.

The heater 408 includes a plurality of parallel rectangles connected alternatively to parallel lines. In some example embodiments, the base is aluminum and the heating element is tin oxide or doped tin oxide.

FIG. 4C shows a heater 410 formed by interconnected parallel lines that form an electrical circuit connecting the two pads used for connection to power. Although four parallel lines are shown, other embodiments may utilize a different number of parallel lines, such as two, six, eight, etc.

In other example embodiments, the power pads may be situated on opposing sides if the number of lines is odd, such as one, three, five, seven, etc.

It is noted that the embodiments illustrated in FIGS. 4A-4C are examples and do not describe every possible embodiment. Other embodiments may utilize different patterns, placement of pads, etc. The embodiments illustrated in FIGS. 4A-4C should therefore not be interpreted to be exclusive or limiting, but rather illustrative.

FIG. 5 is the stator 306 of the Holweck stage 210 with the heaters 502, according to some example embodiments. In some example embodiments, the heaters 502 are printed on the grooves of the stator 306. In the example illustrated in FIG. 5, each groove includes a separate independent heater 502, and each heater 502 includes a pattern as illustrated in FIG. 4B.

The heater 502 includes two electrical pads 504-505 for connecting to power. Sectional view 512 shows the different layers of the heater 502 including a base layer, an isolating layer 510, a resistive layer 508 and a protective coating 506. At the bottom, the base layer is the stator 306. Above the base layer, the isolating layer 510 is placed to isolate electrically (and also thermally) the base layer from the voltage applied to the heater 502. In some example embodiments, the voltage applied is in the range of 40-50V, but other voltages may also be used, such as in the range from 30V to 300V.

The resistive layer 508 is printed on top of the isolating layer 510, and the protective coating 508 may be placed above the resistive layer 508 to protect the resistive layer 508 from gases and residues that might come into contact with the inside of the turbomolecular pump 200. In some example embodiments, the resistive layer 508 is made of tin oxide, but other resistive and semiconductor materials may be used.

In some example embodiments, a hole (not shown) is made in the stator 306 and then power lines (not shown) are printed on a top surface of the stator 306 to power the heaters 502. The hole, also referred to as a feed-through, may be covered (e.g., glass to protect and isolate the wires from the stator 306). In some example embodiments, a small slot may be created on the surface of the stator 306 for the power lines, thus avoiding the power lines protruding above the stator 306. The electrical pads of the heaters 502 may also be indented into the top surface.

The temperature of the heater 502 may be controlled by adjusting the power or by adjusting the resistance of the heater. In some example embodiments, a calibration takes place to determine the power levels associated with the heater 502 for reaching a certain temperature. Calibration may also take place to determine the amount of resistive material of the heater 502, e.g., line thickness (vertically and horizontally), surface area, etc.

For example, a resistive material may provide 0.003 ohms per degree centigrade. By controlling the amount of resistive material, the desired temperature may be reached, (e.g., 4000 degrees Celsius). For example, 1350 degrees C. may be reached in five seconds or less for a heater 502 powered by 120V.

In some example embodiments, the heaters 502 may have a different configuration. For example, one heater may occupy two grooves, where the heater lines go down one groove and up another groove. Similarly, one heater may occupy more than two grooves, or even have one heater that traverses all the grooves.

In other example embodiments, there may be more than one heater 502 on one groove 302. For example, two or three heaters 502 may be placed on the same groove 302 to allow for fine-tuning of the heated location. An example for a configuration with two heaters 502 per groove 302 is described below with reference to FIG. 8. Further yet, all the heaters 502 may be turned on at the same time, or may be turned on at different times.

In other example embodiments, the heater 502 may be printed on the lateral side of the groove 302, that is, on the side wall of the thread 304, or on both lateral sides of the groove 302. This way, the heater 502 is able to provide heat to better facilitate removal of deposits that are formed on the threads 304. In other example embodiments, different combinations of heaters 502 printed on the bottom of the groove 302, on any lateral side of the groove 302, or on both lateral sides of the groove 302 may be implemented for better control of the heating of the stator 306. In order to print the heater 502 on the lateral sides of the groove 302, an angled tip may be used on the 3D printer to reach the sides.

Placing the heaters 502 inside the turbomolecular pump 200 has several advantages, such as having deposits accumulated on the heater 502 itself instead of on the body of the stator 306. The deposits on the heater 502 will be easily removed once the heater 502 is turned on due to the close exposure to the heat source. Further, it is possible to direct the heater 502 to achieve high heating temperatures (e.g., 500° C.) in a short period of time and then cool the heater 502 rapidly to minimize heat transfer to the rotor and to the stator 306. Further, it is possible to achieve peak temperatures on the grooves 302 that are higher than the maximum operating temperature for the rotor. In addition, the cost of the heaters 502 is similar to the cost of using heaters located externally to the gas pump 120. Further, by eliminating deposits in the inside of the gas pump 120, it is possible to run the system longer between cleanings.

Figure 6:
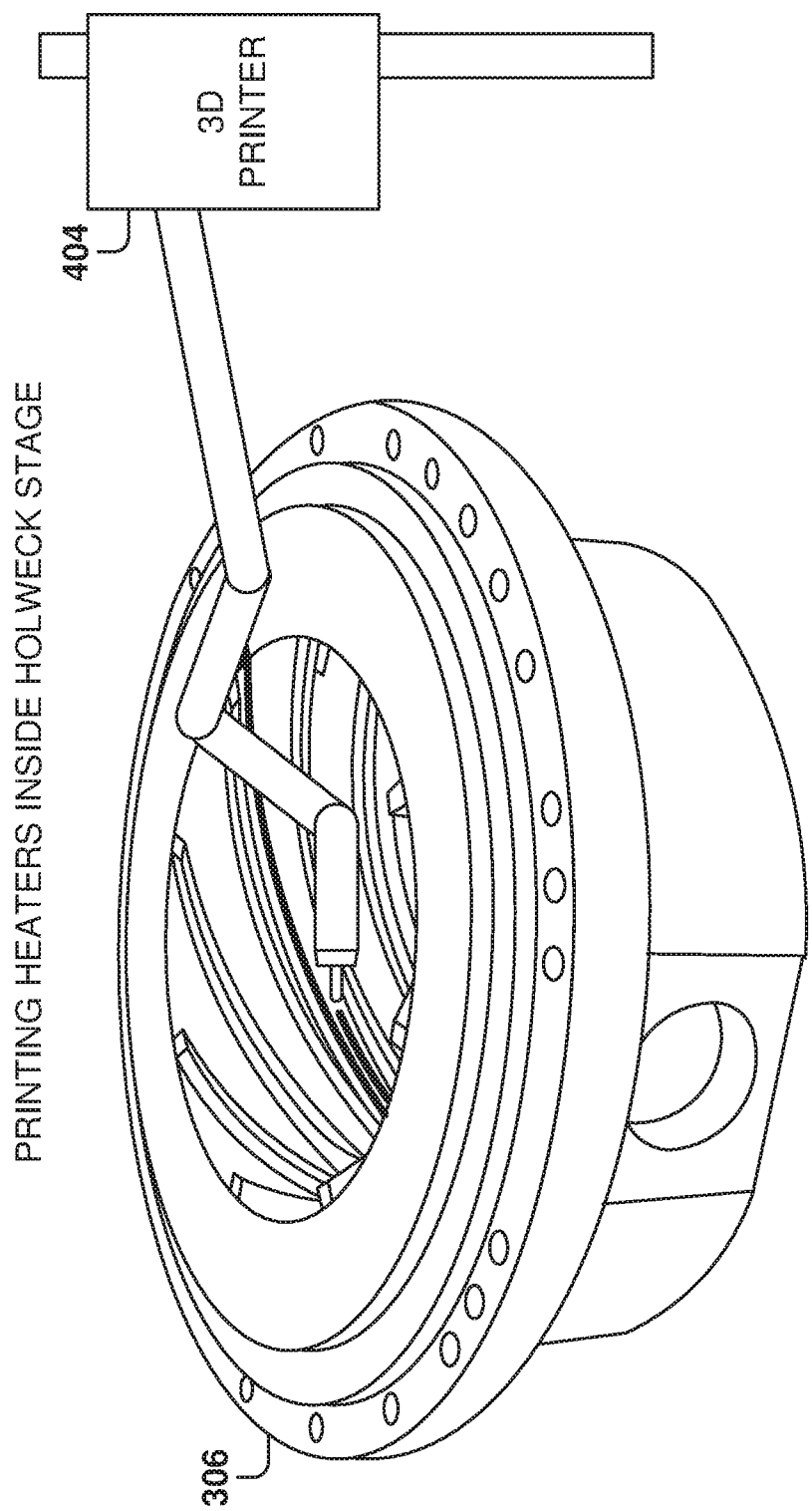
FIG. 6 illustrates the 3D printing of the heater in the groove, according to some example embodiments.

FIG. 6 illustrates the 3D printing of the heater 502 on the groove 302, according to some example embodiments. In some example embodiments, the stator 306 of the Holweck stage 210 remains stationary while the 3D printer 404 prints the heating material on the grooves 302. In some example embodiments, the printing process is an aerosol jet 3D printing process.

In some example embodiments, 3D printer 404 is capable to print on a curved surface, such as the groove 302, a glass bottle, a ball, etc. The 3D printer 404 has six axis of freedom that allows the 3D printer 404 to rotate freely and move around an object for extrusion printing.

In addition, in some example embodiments, the 3D printer 404 has a camera near the printing head which may act as a scanner (or another sensor may be used to measure the distance from the printing head to a surface) to assist the 3D printer 404 to follow the surface being printed closely. This guarantees that the distance from the printing head to the surface remains substantially constant during the printing process.

3D printing has two aspects that are different from conventional printing. First, the material being printed is three-dimensional and has a volume (e.g., heating material has a depth in a range from 0.50 to 50 microns). Second, the printing head moves in a three-dimensional space and can print in any direction, not just print by placing layers of material above each other on a given surface.

Further, it is noted that 3D printing in the three-dimensional space may include several passes over a surface, where each pass of the printing head deposits a thin layer of material, and each pass grows the thickness of the heater 502. The advantage of having multiple passes is that if there is a printing error (e.g., a gap in a line) during one pass, subsequent passes over the same area may fill out and remedy the printing error.

Figure 7:
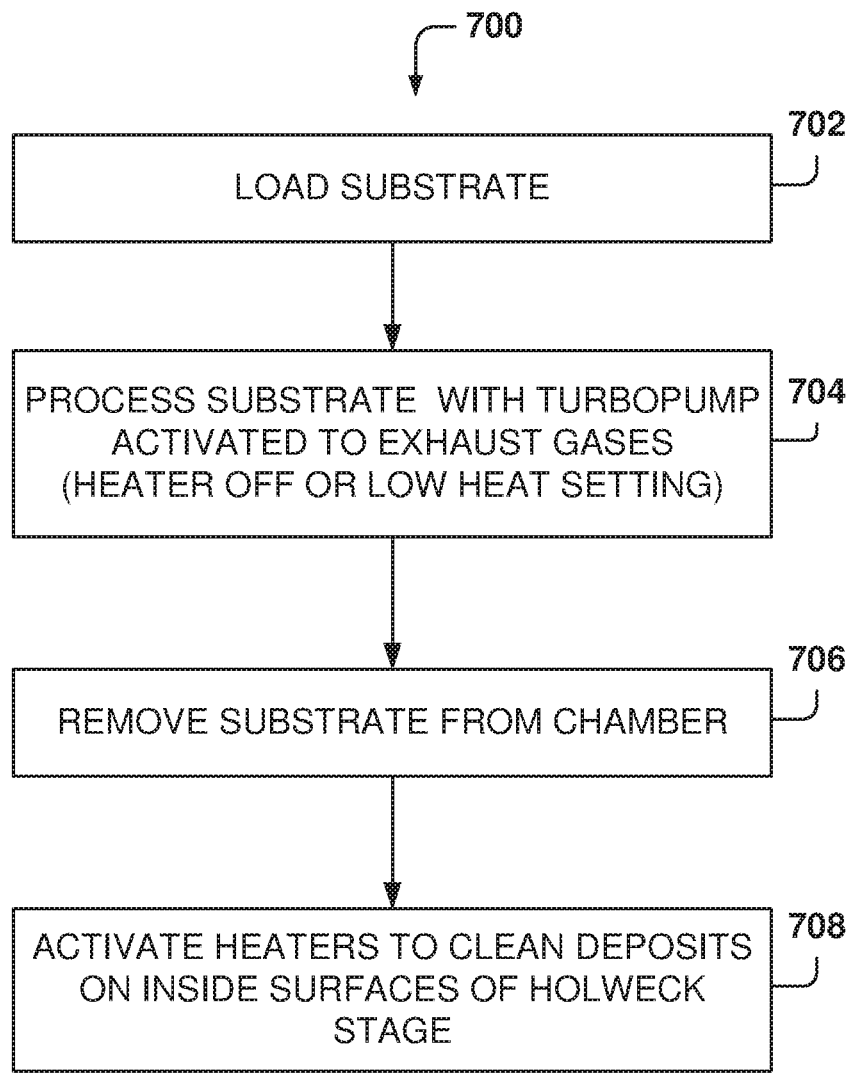
FIG. 7 is a flowchart of a method for processing a substrate and cleaning the chamber thereafter, according to some example embodiments.

FIG. 7 is a flowchart of a method for processing a substrate and cleaning the chamber thereafter, according to some example embodiments. While the various operations in this flowchart are presented and described sequentially, one of ordinary skill will appreciate that some or all of the operations may be executed in a different order, be combined or omitted, or be executed in parallel.

At operation 702, the substrate is loaded in the semiconductor manufacturing chamber. At operation 704, the substrate is processed (e.g., etching operation). During substrate processing, the turbomolecular pump 200 is activated to exhaust the etching gases from the chamber.

In some embodiments, the heaters 502 are turned off while the substrate is being processed. In other example embodiments, the heaters 502 may be turned on, during substrate processing, with low power to heat up the inside of the turbomolecular pump 200 (e.g., 60-80° C.) so as to assist in keeping the gases in gas form and thereby reducing the amount of deposits. One or more of the heaters 502 may be selectively powered or turned on at the same time or at different time to achieve the desired level or amount of heating. Further, the level or amount of heating (and hence, the temperature) may be controlled to avoid interference with the rotor. As discussed earlier, if the rotor gets too hot, beyond the melting point of the rotor material, the rotor may become unbalanced and the turbomolecular pump 200 will not operate properly.

At operation 706, the substrate is removed from the chamber. At operation 708, a cleaning operation is performed on the turbomolecular pump 200 by activating the heaters 502 to clean or otherwise remove the deposits formed and accumulated on the inside surfaces of the Holweck stage 210. The level and duration of heating to be provided by the heaters 502 may vary and may be controlled and adjusted according to the nature and composition of the deposits to be cleaned or removed.

In other example embodiments, the heaters 502 are turned on after a predetermined number of substrates have been processed (e.g., 50 or 100) instead of activating after every substrate.

In some example embodiments, the heater 502 may be turned on for about a minute at about 500° C., which may eliminate 600 μm of deposition from the gases that convert into solids. In other embodiments, the heater 502 may be turned on for a period of time in the range from 5 seconds to 200 seconds. In some example embodiments, desired area(s) with the turbomolecular pump 200 may be heated up to a temperature of about 150-500° C. It is noted that, it is not possible to heat the inside of the turbomolecular pump 200 to this temperature range using an external heater located on the outside of the turbomolecular pump 200.

In some example embodiments, the heaters 503 may be turned on and off several times during the cleaning operation, in a pulsed manner, to avoid overheating the rotor inside the turbomolecular pump 200. For example, the heaters 502 may be turned on from 5 to 10 seconds, turned off for 50 seconds, and then turned on and off again one or more times. Working in the pulsed mode may bring the heaters 502 to a temperature of 500° C. briefly, and for several intermittent cycles, which is significant for cleaning or removing deposits.

In some example embodiments, the output of the turbomolecular pump 200 is monitored and analyzed to check for gases, solids or by-products leaving the turbomolecular pump 200. The heating cycles may be repeated until the output is compliant with predetermined threshold(s) or criteria (e.g., maximum allowable level of select gases, solids or by-products).

With respect to by-products, two compounds were determined to be the primary source of particle problems and turbo stage deposition. First one is a PTFE-like polymer $(CF_2)^n$ and the second is $(NH4)_2SiF_6$ (ammonium hexafluorosilicate). Both of these compounds will volatilize at 500° C. or more, or thermally decompose at 500° C. or more.

Since the deposits will likely be also on the heaters 502 themselves, or very close to the heaters 502, a quick activation to a high temperature will be enough to volatilize or thermally decompose the deposits. The heating is localized and quick to eliminate the deposits, while not affecting the rotor of the turbomolecular pump 200.

By having heaters 502 located on the inside of the turbomolecular pump 200, the external heaters are not needed anymore. This results in cost savings that approximately balance out the additional cost of the heaters 502. Additionally, the elimination of external heaters results in space savings in the manufacturing system or apparatus.

In one example, activating the one or more heaters further comprises activating the one or more heaters after a predetermined number of substrates has been processed.

In one example, the predetermined number of substrates is one (1).

In one example, the predetermined number of substrates is at least two (2).

In one example, activating the one or more heaters further comprises activating the one or more heaters to heat up the inside surface to a temperature that is sufficient for removing deposits formed and accumulated on the inside surface.

In one example, activating the one or more heaters further comprises activating the one or more heaters at different times or all at the same time.

In one example, the one or more heaters further comprises activating the one or more heaters to provide varying levels of heating.

In one example, the varying levels of heating are provided according to deposits to be cleaned from the gas pump.

In one example, the one or more heaters are activated based on analysis of output of the gas pump.

Figure 8:
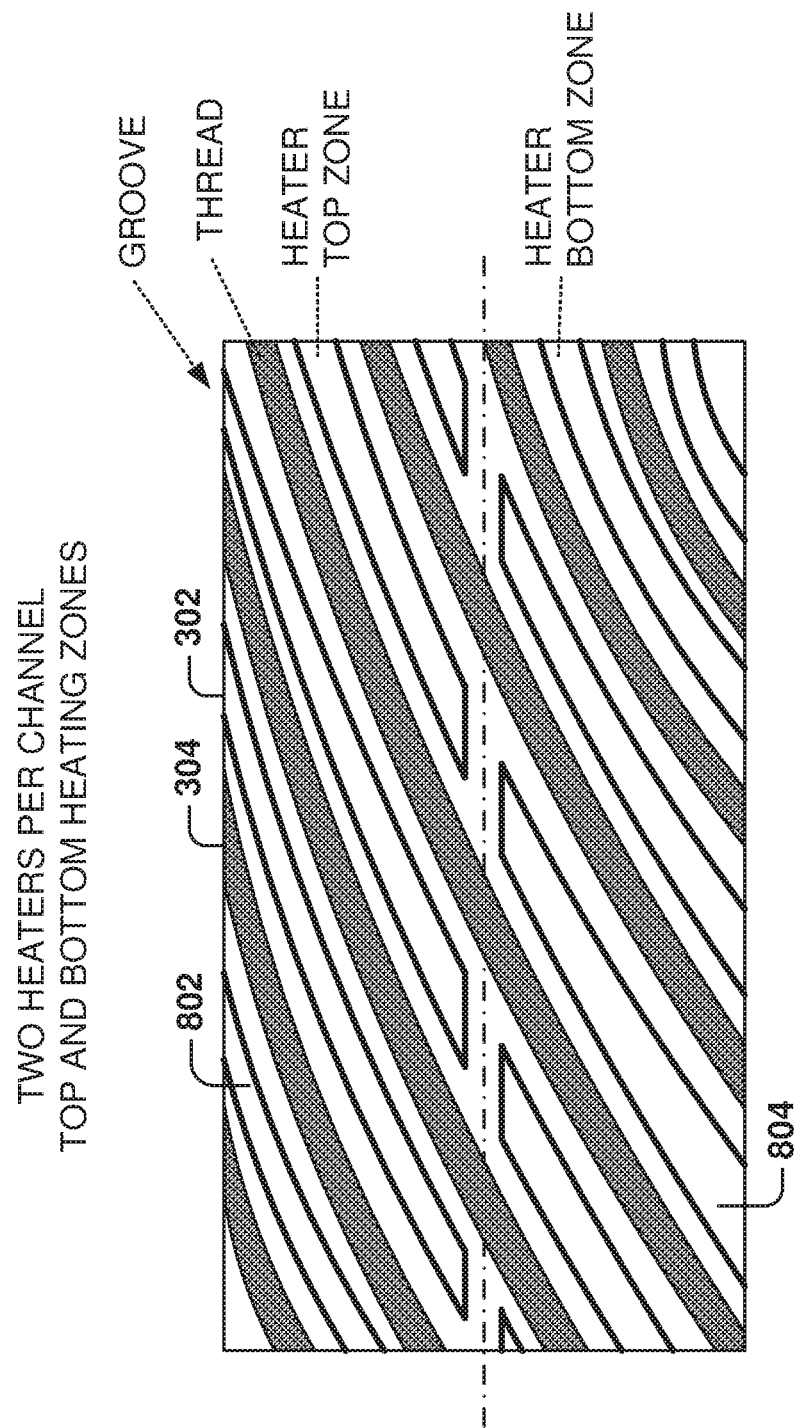
FIG. 8 illustrates the use of two different heating zones, according to some example embodiments.

FIG. 8 illustrates the use of two different heating zones, according to some example embodiments. FIG. 8 illustrates a sectional view of the inside of the stator 306 of the Holweck stage 210, which includes grooves 302 separated by threads 304. A plurality of heaters 802, 804 are printed on the grooves 302.

In some example embodiments, there are two heating zones or sections within each groove 302: a first section (e.g., a top heating zone) with a first plurality of heaters 802 and a second section (e.g., a bottom heating zone) with a second plurality of heaters 804. The first plurality of heaters 802 are powered or turned on at the same time and the second plurality of heaters 804 may be powered or turned at a different time, or at the same time. By having two heating zones within the stator 306, finer temperature control may be obtained on the inside of the Holweck stage 210. Further, one or more of the first plurality of heaters 802 may be powered or turned on at the same time or at different time; likewise, one or more of the second plurality of heaters 804 may be powered or turned on at the same time or at different time.

As the gases go down in the turbomolecular pump 200, the pressure increases, so more deposits may be formed on the bottom section than in the top section. Therefore, the bottom heaters 804 may be turned on for a longer period of time than the top heaters 802.

In other example embodiments, the heaters 802, 804 may not cover the complete area of the grooves 302, and it may be enough to have fewer heaters 502 to provide enough temperature in the Holweck stage 210. For example, the grooves 302 may alternate between grooves 302 without a heater 802, 804 and grooves 302 with a heater 802, 804.

Figure 9:
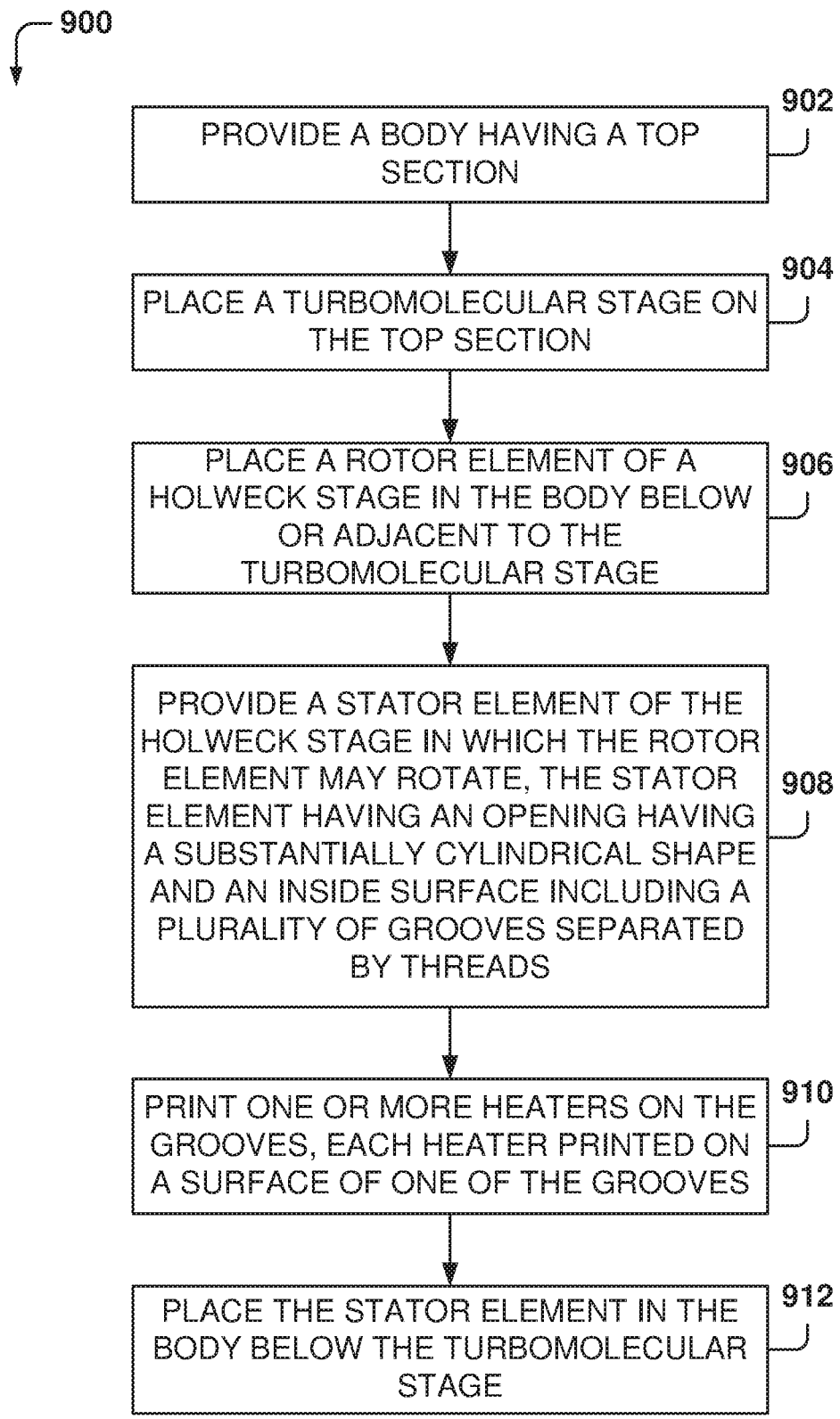
FIG. 9 is the flowchart of a process for manufacturing a gas pump, according to some example embodiments.

FIG. 9 is the flowchart of a process 900 for manufacturing a turbomolecular pump 200, according to some example embodiments. While the various operations in this flowchart are presented and described sequentially, one of ordinary skill will appreciate that some or all of the operations may be executed in a different order, be combined or omitted, or be executed in parallel.

At operation 902, a body having a top section is provided. From operation 902, the process 900 flows to operation 904 for placing a turbomolecular stage in the top section.

From operation 904, the process 900 flows to operation 906 for placing a rotor element of a Holweck stage in the body below or adjacent to the turbomolecular stage. Operation 908 is for providing a stator element of the Holweck stage in which the rotor element may rotate in use. The stator element has an opening, the opening having a substantially cylindrical shape and an inside surface including a plurality of grooves. Each of the plurality of grooves has a surface and the plurality of grooves is separated by threads.

At operation 910, one or more heaters are printed on the surfaces of corresponding grooves, each heater printed on at least a surface of a corresponding groove. From operation 910, the process 900 flows to operation 912 where the stator element is placed in the body below the turbomolecular stage.

In one example, the printing is performed by a 3D printer that places resistive material on the surface of the groove. In another example, the 3D printer is coupled to one or more connected robotic arms that enable the 3D printer to print on a helical surface of the groove.

In one example, each heater comprises a resistive material disposed on a surface of one of the grooves.

In one example, the plurality of grooves has a helical or spiral shape.

In one example, the process 900 further comprises placing, before printing the one or more heaters, a dielectric coating layers on the surface of the grooves, where the one or more heaters are placed on the dielectric coating layers.

In one example, each heater is placed on the surface of the groove extending from a top portion of the groove to a bottom portion of the groove, wherein each heater comprises connection pads for connecting to electrical power.

In one example, the heaters are disposed in a zigzag pattern formed by resistive material or in parallel lines of a resistive material.

Figure 10:
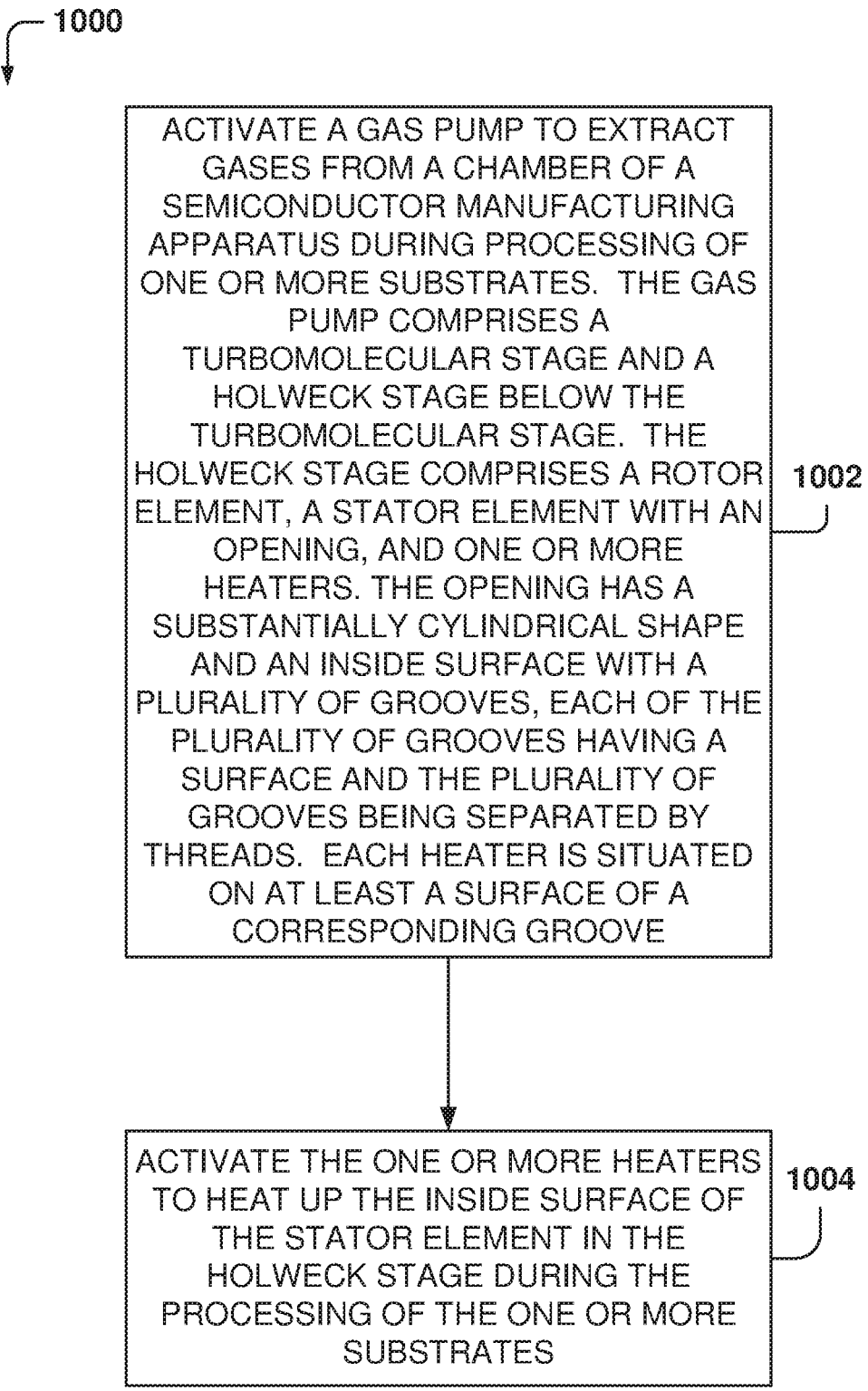
FIG. 10 is a flowchart of a method for operating a gas pump during substrate processing, according to some example embodiments.

FIG. 10 is a flowchart of a method for operating a gas pump during substrate processing, according to some example embodiments. The method 1000 includes an operation 1002 for activating a gas pump to extract gases from a chamber of a semiconductor manufacturing apparatus during processing of one or more substrates. The gas pump comprises a turbomolecular stage and a Holweck stage below the turbomolecular stage. The Holweck stage comprises a rotor element, a stator element with an opening, and one or more heaters.

The opening has a substantially cylindrical shape and an inside surface with a plurality of grooves, each of the plurality of grooves having a surface and the plurality of grooves being separated by threads. Each heater is situated on at least a surface of a corresponding groove.

From operation 1002, the method flows to operation 1004 for activating the one or more heaters to heat up the inside surface of the stator element in the Holweck stage during the processing of the one or more substrates.

In one example, activating the one or more heaters further comprises activating the one or more heaters to a temperature sufficient to prevent formation of deposits.

In one example, activating the one or more heaters further comprises activating the one or more heaters intermittently during the processing of the one or more substrates.

In one example, activating the one or more heaters intermittently further comprises activating the heaters for a period between one and twenty seconds, and deactivating the heaters for a period between one and twenty seconds.

In one example, activating the one or more heaters further comprises activating the one or more heaters to provide varying levels of heating according to deposits to be prevented from forming and accumulating on the inside surface during processing of the one or more substrates.

In one example, activating the one or more heaters further comprises activating the one or more heaters at different times or all at the same time.

In one example, the varying levels of heating are provided according to deposits to be stopped from forming on the gas pump.

In one example, the one or more heaters are activated based on analysis of output of the gas pump.

Figure 11:
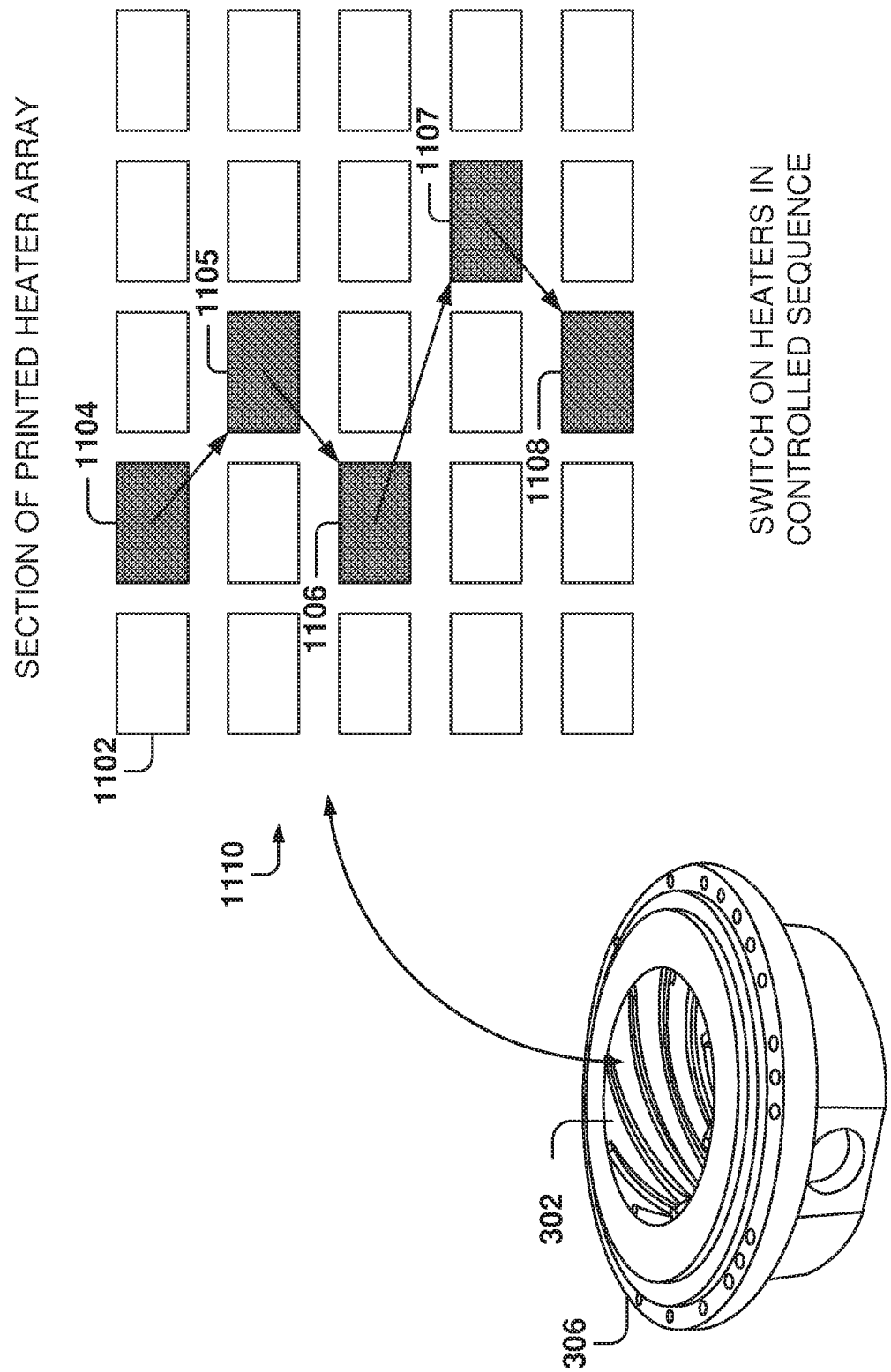
FIG. 11 illustrates the use of an array of heaters with independent switching control, according to some example embodiments.

FIG. 11 illustrates the use of an array of heaters 1110 with independent switching control, according to some example embodiments. In some example embodiments, a plurality of heaters is disposed in each of the grooves 302, and each heater may be switched on or off independently. This way, a finer control is provided throughout the interior surface of the stator 306 of the Holweck stage 210.

Array 1110 represents the different heating elements 1102, where each column represents the heating elements in a groove 302, and each row represents the different heating elements 1102 inside of each groove 302 (from top to bottom). For description purposes, each heating element 1102 is associated with a pair of values responding to the row and the column (r, c). For example, heating element 1104 is represented as (1, 2) and heating element 1105 is represented as (2, 3). It is to be noted that array 1110 represents a section of all the heating elements, and a different number of array configurations are also possible, such as arrays with fewer or additional rows and fewer or additional columns.

In some example embodiments, the width of the groove 302 may vary from top to bottom and the width of the heating elements 1102 may also vary to accommodate the width of the groove 302 at the location where the heating element 1102 is located.

In some example embodiments, the heating elements 1102 may be switched on and off in a sequence, which allows for the control of the amount of heating provided to the stator 306. The sequence illustrated in FIG. 11, shows that heating element 1104 (1, 2) is switched on first, then switched off, followed by heating elements 1105 (2, 3), 1106 (3, 2), 1107 (4, 3), and 1108 (5, 3). The sequence may then be restarted by the controller to remove deposits after other sequences for other heating elements 1102 are activated.

By controlling what heater is turned on, the controller controls the temperature on the inside surface of the Holweck stage 210, e.g., to make sure that not too much heat is transferred one section of the Holweck stage 210.

In other example embodiments, other sequences may be configured to spread out the heating generated by the array 1110. For example, the sequence may select heating elements 1102 at random, or use a top to bottom approach, by switching on the heating elements of one row at the same time, then another row, and so forth. In another example embodiment, the heating elements of one column may be switched on simultaneously, and then other columns are selected at different times.

In some example embodiments, the controller switches on the heating element 1102 until the heating element 1102 reaches a desired temperature, and then the heating element 1102 is turned off. In some example embodiments, the heating element 1102 temperature may be measured by measuring the amount of resistance of the heating element 1102, as the resistance is correlated to the temperature.

When applying a constant heat input to heating element 1102, the temperature of the heating element 1102 will gradually rise until the deposits on the heating element 1102 start converting from solid to gas, e.g., sublimation of the deposit. During sublimation, the temperature remains constant until all the deposits have been evaporated. This is similar to boiling a pot of water; the temperature will gradually increase to 100° C. and the water will start boiling, which means that the temperature will remain at 100° C. Once all the water is evaporated, the temperature of the pot may continue to rise above 100° C. More details are provided below with reference to FIG. 12 for the evolution of temperature over time.

Thus, when the temperature of the heating element 102 starts rising again after a period of constant temperature, the heating element 1102 is switched off because the deposits have already been cleared. Another heating element 1102, or other heating elements, will be switched on to continue eliminating deposits. In some example embodiments, the temperature of the heating element 1102 is controlled to ensure that the temperature does not go above a threshold temperature to avoid damage to the stator 306.

One benefit of sequential heating element 1102 activation is that a reduced heat load is brought into the turbopump, as compared to running all the heaters at the same time. Additionally, by not activating all heaters at the same time, the power supply may be reduced due to the decreased load. Further yet, electrical energy may be safe by controlling which heating elements 1102, and for how long, are turned on based on the presence of deposits on the heating element 1102.

In some example embodiments, a self-learning procedure may be implemented to adjust the timing for the heating elements 1102 based on the temperature.

Figure 12:
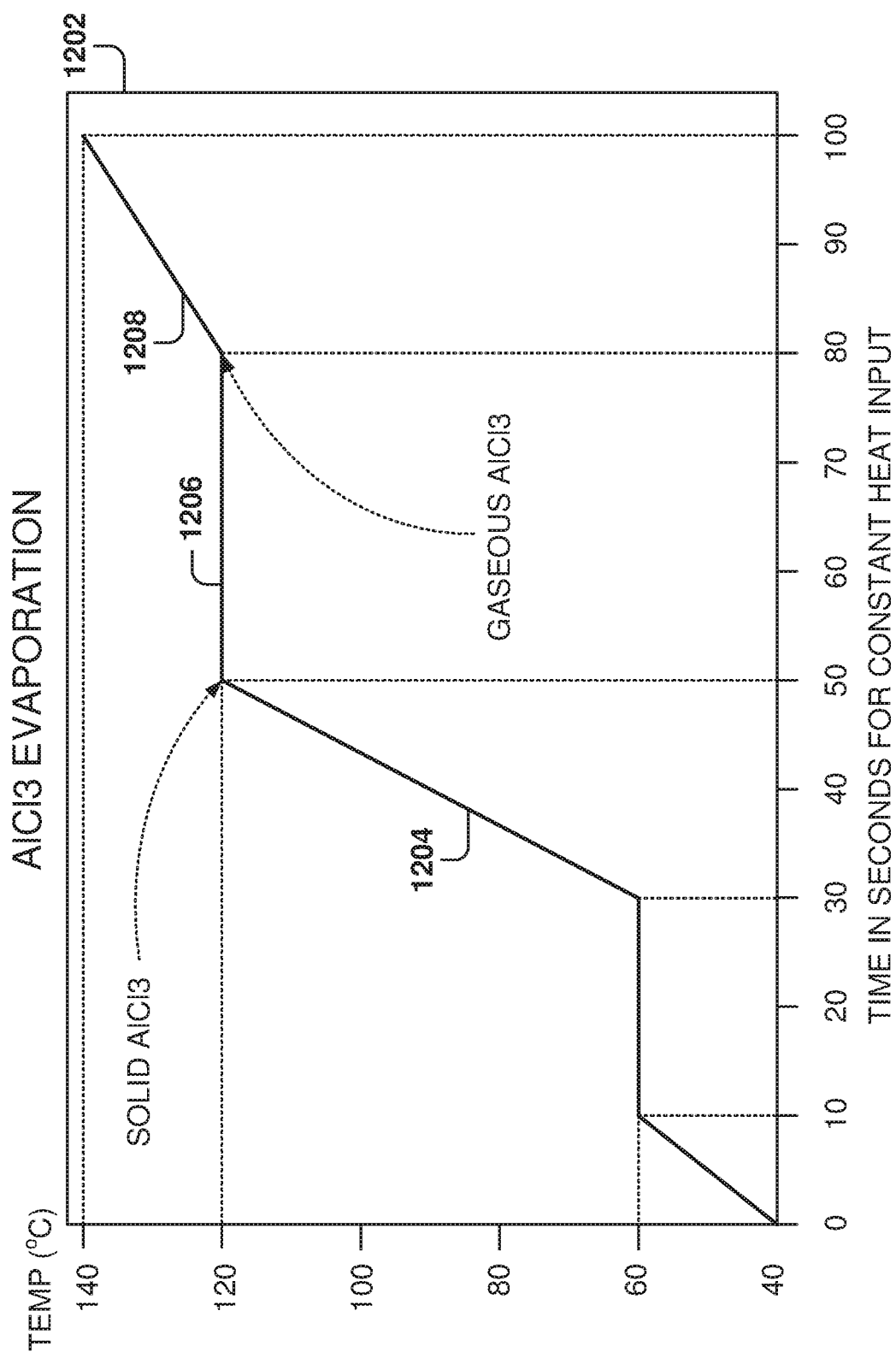
FIG. 12 illustrates the evolution of temperature over time for constant heat input in the presence of deposits, according to some example embodiments.

FIG. 12 illustrates the evolution of temperature over time for constant heat input in the presence of deposits, according to some example embodiments. In some example embodiments, the target temperature for the heating element is based on the temperature at which the deposits turn from solid to gas, also referred to as sublimation.

The target temperature is set a few degrees above the sublimation temperature. In some example embodiments, the target temperature is 5° C. above the temperature at which the deposits turn from solid to gas, but other thresholds may be used. Thus, if the sublimation temperature is 70° C., the target temperature for the heating element is 75° C.

FIG. 12 illustrates an example for eliminating aluminum chloride ($AlCl_3$) deposits. The sublimation temperature of $AlCl_3$ is 120° C. Chart 1202 shows an example of activating the heating element 1102 for eliminating $AlCl_3$ deposits. The vertical axis is the temperature at the heating element 1102, and the horizontal axes is for time (in seconds) when applying constant heat input to the heating element 1102.

After 30 seconds, the temperature is gradually rising 1204 until the temperature reaches 120° C. at 50 seconds. From 50 seconds to 80 seconds, the temperature stays constant 1206 because the $AlCl_3$ deposits are being eliminated and the energy provided by the heating element is used to convert the deposits into gas.

At 80 seconds, the temperature starts rising again 1208, which means that the deposits have been eliminated. In some example embodiments, the threshold temperature is 125° C., so the heating element would be turned off at the time when the temperature reaches 125° C.

In some example embodiments, the temperature is measured based on the resistance of the heating element 1102. In some example embodiments, the power applied to the heating element is turned off momentarily while the resistance is measured. In other example embodiments, a thermocouple may be mounted near the heating element 1102 to check the temperature (at least based on the distance from the thermocouple to the heating element).

In some example embodiments, the amount of time that the heating element 1102 has to be switched on to eliminate deposits may be used to identify the thickness of the deposit. This information may be used for troubleshooting the performance of the chamber. For example, if a large amount of deposits starts being accumulated on the turbopump, preventive maintenance may be applied to identify the problem.

Figure 13:
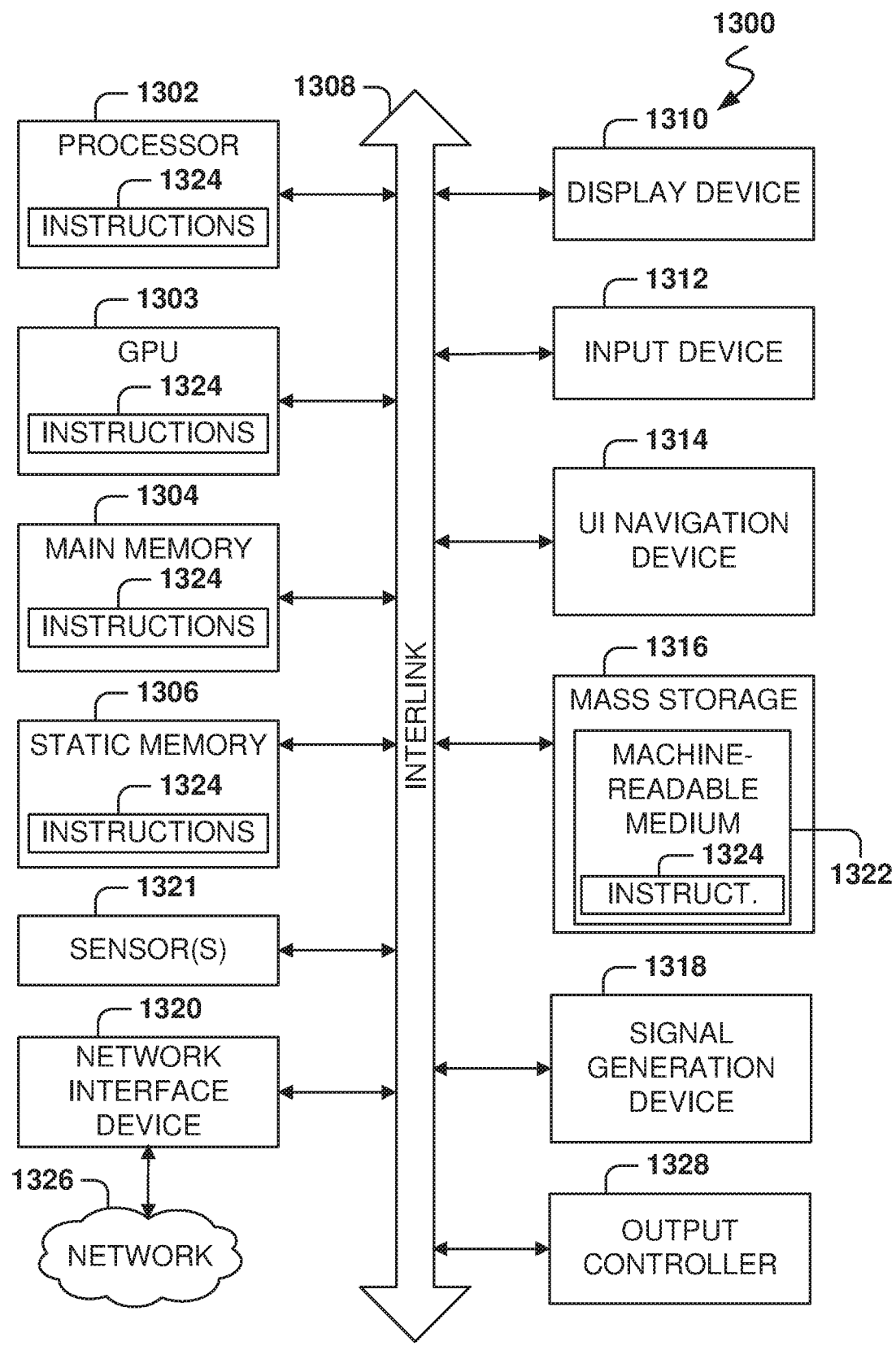
FIG. 13 is a block diagram illustrating an example of a machine upon which one or more example embodiments may be implemented.

FIG. 13 is a block diagram illustrating an example of a machine 1300 upon which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or other sensor. The machine 1300 may include an output controller 1328, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A gas pump having an upper section and configured for extracting gases from a chamber, the gas pump comprising:
   a turbomolecular stage arranged in the upper section; and
   a Holweck stage arranged below or adjacent to the turbomolecular stage, the Holweck stage comprising:
      a rotor element;
      a stator element with an opening, the opening having a substantially cylindrical shape and an inside surface including a plurality of grooves, each of the plurality of grooves having a surface and the plurality of grooves being separated by threads; and
      one or more heaters, each heater situated on one or more surfaces of the plurality of grooves.

2. The gas pump as recited in claim 1, wherein each heater comprises a resistive material disposed on the surface of the corresponding groove.

3. The gas pump as recited in claim 1, further comprising:
a dielectric coating layer placed between each heater and the surface of the corresponding groove.

4. The gas pump as recited in claim 1, wherein the plurality of grooves has a helical or spiral shape.

5. The gas pump as recited in claim 1, wherein each heater is placed on the surface of the corresponding groove extending from a first end of the corresponding groove to a second end of the corresponding groove, and wherein each heater comprises one or more connection pads for connecting to electrical power.

6. The gas pump as recited in claim 1, wherein the one or more heaters include a plurality of first heaters and a plurality of second heaters, and wherein one or more of the plurality of first heaters is placed on a first section of a corresponding groove and one or more of the plurality of second heaters is placed on a second section of the corresponding groove.

7. The gas pump as recited in claim 6, wherein the first plurality of heaters and the second plurality of heaters are turned on at the same time or at different times.

8. The gas pump as recited in claim 6, wherein one or more of the first plurality of heaters are turned on at the same time or at different times, and wherein one or more of the second plurality of heaters are turned on at the same time or at different times.

9. The gas pump as recited in claim 1, wherein at least one heater is disposed in a zigzag pattern formed by resistive material.

10. The gas pump as recited in claim 1, wherein at least one heater is disposed in parallel lines of resistive material.

11. The gas pump as recited in claim 1, wherein one of the one or more heaters is situated on surfaces of two or more grooves from the plurality of grooves.

12. The gas pump as recited in claim 1, wherein at least two of the one or more heaters are situated on one surface of one groove from the plurality of grooves.

13. The gas pump as recited in claim 12, wherein the at least two of the one or more heaters are turned on at the same time or at different times.

14. The gas pump as recited in claim 1, wherein the one or more heaters are configurable to provide varying levels of heating.

15. The gas pump as recited in claim 14, wherein the level of heating is selected based on an amount of deposits to be cleaned from the gas pump.

16. The gas pump as recited in claim 1, wherein the one or more heaters are turned on based on an analysis of an output of the gas pump.

17. The gas pump as recited in claim 1, wherein the one or more heaters comprise a plurality of heating elements that are independently controlled, each of the plurality of grooves including one or more of the heating elements.

18. The gas pump as recited in claim 17, wherein at least one of the plurality of heating elements is switched on to eliminate a first type of deposit material and turned off when a temperature of the heating element is above a sublimation temperature of the first type of deposit material.

* * * * *

UNITED STATES PATENT AND TRADEMARK OFFICE
CERTIFICATE OF CORRECTION

PATENT NO. : 10,655,638 B2
APPLICATION NO. : 15/922857
DATED : May 19, 2020
INVENTOR(S) : Smith et al.

Page 1 of 1

It is certified that error appears in the above-identified patent and that said Letters Patent is hereby corrected as shown below:

On the Title Page

Item (73), in "Assignee", in Column 1, Line 1, delete "Freemont," and insert --Fremont,-- therefor On page 2, in Column 1, item (56), under "Other Publications", Line 3, delete "flurosilicate"," and insert --fluorosilicate",-- therefor In the Specification In Column 7, Line 13, delete "212." and insert --224.-- therefor In Column 9, Line 29, delete "508" and insert --506-- therefor In Column 9, Line 57, delete "4000 degrees Celsius)." and insert --400° C.).-- therefor In Column 9, Line 57, delete "1350 degrees C." and insert --135° C.-- therefor In Column 15, Line 30, delete "102" and insert --1102-- therefor Signed and Sealed this
Fifth Day of January, 2021

Andrei Iancu
*Director of the United States Patent and Trademark Office*